Figure 1:
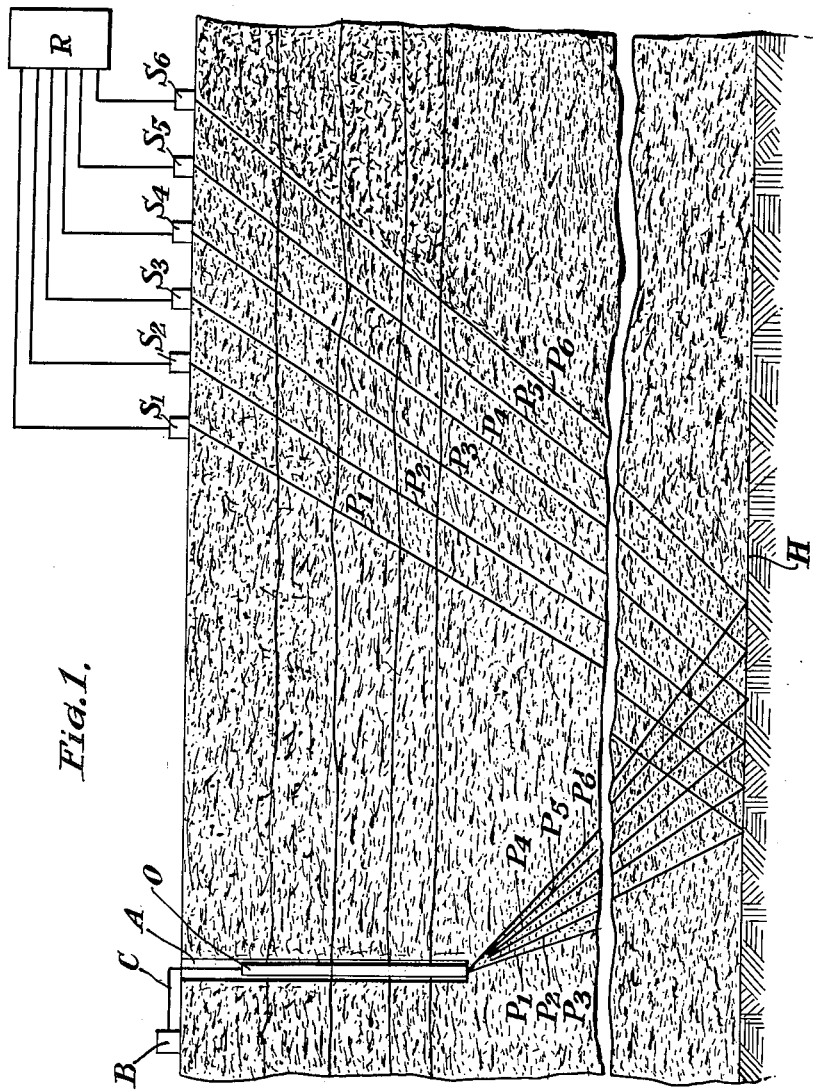

March 28, 1939.　　B. B. WEATHERBY　　2,151,878
SEISMIC SURVEYING
Filed April 15, 1937　　2 Sheets-Sheet 1

INVENTOR
Benjamin B. Weatherby
BY Kenyon & Kenyon
ATTORNEYS

March 28, 1939.  B. B. WEATHERBY  2,151,878
SEISMIC SURVEYING
Filed April 15, 1937   2 Sheets-Sheet 2

INVENTOR.
Benjamin B. Weatherby
BY Kenyon & Kenyon
ATTORNEYS.

Patented Mar. 28, 1939

2,151,878

UNITED STATES PATENT OFFICE 2,151,878

SEISMIC SURVEYING

Benjamin B. Weatherby, Tulsa, Okla., assignor to Geophysical Research Corporation, New York, N. Y., a corporation of New Jersey Application April 15, 1937, Serial No. 137,013

2 Claims. (Cl. 181—0.5)

This invention relates to sub-surface seismic surveying and is particularly applicable in the art of making reflection seismic surveys by the correlation method. The basis of this method is the similarity in appearance of records of reflections obtained from a given sub-surface stratographic horizon extending over a considerable area. To obtain such reflection records, explosive charges are detonated in a plurality of bore holes distributed over the area and reflection waves are received at recording stations associated with the bore holes, there being a receiving station individual to each bore hole. Because the above-referred to similarity of records, it is possible to calculate the variation in depth of the reflecting horizon over considerable areas by first correlating the reflection records at different points in the area under investigation, that is, by identifying corresponding phases of the same reflection on each record and then calculating the depth to the reflecting horizon at each point. These calculations are based upon the time intervals between the detonation of the seismic charge and the arrival at several spaced receiving stations of the same phase of the corresponding reflections as indicated by the several records. Obviously, this method cannot be used if the appearance or character of the record of the reflection coming from the sub-surface horizon being mapped changes radically from one recording position to another. If the changes are so great that it becomes impossible to correlate the records, i. e. to identify corresponding phases of the reflections on the several records, then the variation in the depth to the reflecting horizon cannot be accurately followed.

I have found that a serious cause of character variation in reflections coming from a given subsurface horizon is directly connected with the nature of the impulse generated at the shot position by the detonation of the seismic charge. I have also found that in an area characterized by a surface layer comprising different types of earth strata, such character variations may be produced merely by detonating seismic charges in the different strata and may be of such degree that a reflection record produced by a charge detonated in one stratum will produce a record which is uncorrelatable with other records produced by the detonation of explosive charges in the same area. Considerable difficulty, therefore, may be experienced in surveying such area by the correlation method.

An object of this invention is to minimize the possibility of miscorrelating reflection records.

According to this invention, an explosive charge is provided which extends into more than one stratum as distinguished from the concentrated charge heretofore used. The effect of the explosive charge is thereby exerted in more than one stratum instead of being confined to a single stratum. A variation in the character of the resulting wave due to the nature of one stratum will, therefore, have but little effect upon the resulting total impulse. This procedure, therefore, minimizes the character changes caused by variations in the form of the exciting impulse.

Figure 2:
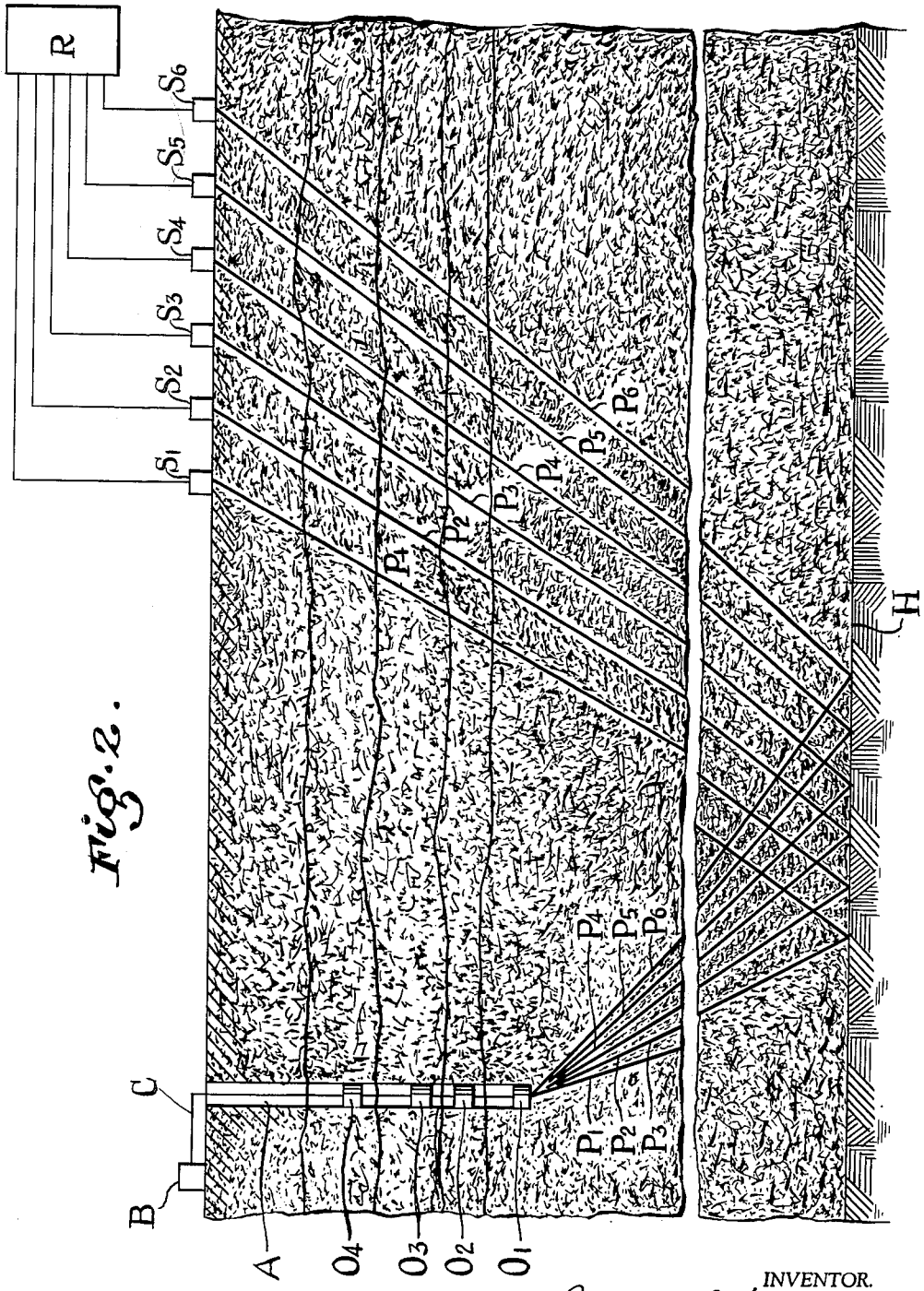

Other objects, novel features and advantages of this invention will become apparent from the following specification and accompanying drawings, in which Fig. 1 diagrammatically illustrates one embodiment of the invention;

Fig. 2 diagrammatically illustrates another embodiment of the invention, and

Figure 3:
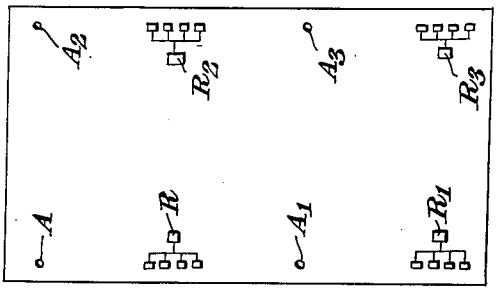

Fig. 3 diagrammatically illustrates the area under survey.

In Fig. 1, A represents a bore hole in the earth of any desired depth while $S_1$, $S_2$, $S_3$, $S_4$, $S_5$ and $S_6$, represent seismometers arranged at different distances from the mouth of the hole. The seismometers are suitably connected to a recorder R, which is designed to produce records of the waves received by the various seismometers. In the bore hole is provided an explosive charge O distributed in a continuous line from the bottom of the hole upward and traversing one or different types of earth strata as indicated in the drawings. A single blasting cap, located at the top of the charge, is sufficient to detonate the charge substantially instantaneously since the velocity of detonation of the blasting gelatin commonly used is of the order of 13,000 feet per second. An even closer approximation to a simultaneous detonation of the entire charge may be obtained by the use of a primer commonly known by the name Cordeau. The lines $P_1$, $P_2$, $P_3$, $P_4$, $P_5$ and $P_6$ indicate the paths followed by waves produced by the detonation of the charge O and reflected from the sub-surface horizon H to the various seismometers. The hole A may be of any depth but for illustration purposes, it may be considered as 100 feet deep with the charge O extending from a point near the bottom of the hole to a point near the top of the hole.

In Fig. 2, A represents a hole bored in the earth to any desired depth while $S_1$, $S_2$, $S_3$, $S_4$, $S_5$ and $S_6$ represent seismometers arranged at different distances from the mouth of the hole. The seismometers are suitably connected to a recorder R which is designed to produce traces of the waves received by the various seismometers. The reference characters $O_1$, $O_2$, $O_3$ and $O_4$ indicate explosive charges located at different depths in the hole. These charges are connected through a conductor C with a detonator B of the usual type for detonating an explosive charge. The lines $P_1$, $P_2$, $P_3$, $P_4$, $P_5$ and $P_6$ indicate the paths followed by waves produced by the detonation of the charge $O_1$ and reflected from the sub-surface horizon H to the various seismometers. For the sake of clearness, the wave paths are shown only in connection with the charge $O_1$. The hole A may be of any depth, but for illustration purposes, the hole may be considered as 100 feet deep with the charge $O_1$ arranged at the bottom of the hole, the charge $O_2$ arranged at a depth of 80 feet, the charge $O_3$ arranged at a depth of 70 feet and the charge $O_4$ arranged at the depth of 45 feet. The charge $O_1$ need not be arranged at the bottom of the hole, but the hole may be continued some distance therebeyond.

In practicing this invention, it is immaterial whether the records be taken with the seismic charges planted at different depths in the same hole or whether they are planted at different depths in closely adjacent holes. It is essential only that the different depth charges be detonated in holes substantially the same distance from the seismometers and in the same direction.

Although the above-described method is of primary importance in seismic surveying by the correlation method, it is also applicable in the method of seismic surveying commonly known as "dip shooting". In the latter method, no attempt is made to correlate the reflections obtained from one recording position to another. It is merely necessary to pick out corresponding phases of the reflections appearing on each individual record, since the reflection records are used merely in calculating the dip of the subsurface bed. Although variations in character from one recording position to another are, therefore, of little importance, it has been found that in some areas more distinct reflections are obtained when the depth at which the seismic charge is planted is varied. In this type of surveying, therefore, the procedure above described is also of considerable value.

In the event that the explosive charge is detonated in a continuous line from the bottom of the hole upward, it is desirable that the upper end of the charge be kept below approximately fifteen feet from the surface in order to avoid blowing out. In the event that separate charges are used, the exact depths at which the charges are planted are of little importance and also the distances between the charges bear no specific relationship to each other. In this case also it is desirable to plant the uppermost charge not less than 15 ft. below the surface.

In Fig. 3 is illustrated a common arrangement of shot points in an area being surveyed by the correlation method. In this figure, A represents the shot hole illustrated in Figs. 1 and 2, while R represents the recording position also illustrated in Figs. 1 and 2, each recording position being equipped with a plurality of seismometers as shown in said two figures. Other bore holes in the area are indicated by the reference characters $A_1$, $A_2$ and $A_3$ while the recording stations associated with such bore holes are indicated by the reference characters $R_1$, $R_2$ and $R_3$. The seismometers may be placed at any suitable distance from the mouth of the bore hole but for illustration purposes they may be assumed to be spaced respectively 2000 feet, 2200 feet, 2400 feet, 2600 feet, 2800 feet and 3000 feet from the mouth of the bore hole.

I claim:

1. In the method of seismic surveying by correlation of reflection records, produced by detonation of explosive charges in bore holes in an area characterized by a surface layer composed of different types of earth strata, the procedure which comprises arranging in a bore hole in such layer an explosive charge extending into at least two different strata, detonating said charge substantially instantaneously, receiving reflected seismic waves thus produced at a plurality of points differently spaced from the mouth of the bore hole and making records of the waves received at said points.

2. The method according to claim 1 wherein said explosive charge is continuous and extends from substantially the bottom of said bore hole substantially to the top thereof.

BENJAMIN B. WEATHERBY.